United States Patent
Usui

(10) Patent No.: US 9,504,127 B2
(45) Date of Patent: Nov. 22, 2016

(54) ILLUMINATION APPARATUS MANAGEMENT SYSTEM AND INFORMATION COMMUNICATION TERMINAL

(71) Applicant: Panasonic Intellectual Property Management Co., Ltd., Osaka (JP)

(72) Inventor: Takamasa Usui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/726,231

(22) Filed: May 29, 2015

(65) Prior Publication Data
US 2015/0351196 A1    Dec. 3, 2015

(30) Foreign Application Priority Data
Jun. 3, 2014  (JP) ................................ 2014-115309

(51) Int. Cl.
*H05B 37/02*    (2006.01)

(52) U.S. Cl.
CPC .......... *H05B 37/0209* (2013.01); *H05B 37/02* (2013.01)

(58) Field of Classification Search
CPC .................................................... H05B 37/02
USPC .................... 315/291, 297, 307, 308, 312
See application file for complete search history.

(56) References Cited

U.S. PATENT DOCUMENTS

| | | | | |
|---|---|---|---|---|
| 2001/0030597 A1* | 10/2001 | Inoue | ..................... | G05B 15/02 340/3.7 |
| 2008/0067871 A1* | 3/2008 | Black | ..................... | H05B 37/02 307/41 |
| 2009/0085500 A1* | 4/2009 | Zampini, II | ....... | H05B 33/0857 315/297 |
| 2012/0299509 A1* | 11/2012 | Lee | ..................... | H04L 41/0806 315/291 |
| 2014/0070706 A1* | 3/2014 | Fushimi | ............. | H05B 33/0863 315/131 |
| 2014/0139140 A1* | 5/2014 | Yeh | ........................ | G05B 24/02 315/297 |
| 2014/0184100 A1* | 7/2014 | Yamada | ............ | H05B 37/0245 315/297 |

FOREIGN PATENT DOCUMENTS

| | | |
|---|---|---|
| JP | 2003-331051 A | 11/2003 |
| JP | 2004-104753 A | 4/2004 |

* cited by examiner

*Primary Examiner* — Tung X Le
(74) *Attorney, Agent, or Firm* — McDermott Will & Emery LLP

(57) ABSTRACT

Illumination apparatus management system includes a plurality of illumination apparatuses, and server. Each of the plurality of illumination apparatuses transmits a status of use of illumination apparatus to server. Server includes: communication unit that obtains the status of use of the illumination apparatus transmitted by each of the plurality of illumination apparatuses, and obtains a requirement from a user; and selector that selects illumination apparatus matching the obtained requirement from among the plurality of illumination apparatuses based on the obtained status of use, and outputs a selection result indicating illumination apparatus that has been selected.

14 Claims, 11 Drawing Sheets

FIG. 3

| ID | MODEL | INITIAL COLOR TEMPERATURE | INITIAL BRIGHTNESS | CUMULATIVE LIGHTING TIME | LEASE PERIOD | INSTALLATION SITE | PRICE |
|---|---|---|---|---|---|---|---|
| 001 | AA-01 | 5000 K | 3500 lm | 10000 h | 2013.12 - 2014.12 | α PREFECTURE | 2000/MTH |
| 002 | AA-01 | 5000 K | 3500 lm | 15000 h | 2014.1 - 2015.3 | β PREFECTURE | 2000/MTH |
| 003 | AB-02 | 4200 K | 2000 lm | 5000 h | 2012.12 - 2014.7 | β PREFECTURE | 3000/MTH |
| 004 | AC-01 | 6500 K | 4000 lm | 7500 h | IDLE | γ PREFECTURE | 2500/MTH |
| 005 | AC-03 | 2800 K | 3500 lm | 20000 h | IDLE | δ PREFECTURE | 2000/MTH |

# ILLUMINATION APPARATUS MANAGEMENT SYSTEM AND INFORMATION COMMUNICATION TERMINAL

CROSS REFERENCE TO RELATED APPLICATION

This application claims the benefit of priority of Japanese Patent Application Number 2014-115309, filed Jun. 3, 2014, the entire content of which is hereby incorporated by reference.

BACKGROUND OF THE INVENTION

1. Field of the Invention

The present disclosure relates to an illumination apparatus management system, etc., managing a plurality of illumination apparatuses.

2. Description of the Related Art

Solid-state light-emitting elements such as light-emitting diodes (LEDs) have a small size, a high efficiency and a long life, and thus hold great promise as a light source of various products. Among those products, research and development of illumination apparatuses including LEDs have been carried out in recent years.

On the other hand, a maintenance and management system has been known for leasing (renting out) a fluorescent lamp for illumination and ensuring management such as replacement and disposal of the lamp after the rental (for example, see Japanese Unexamined Patent Application Publication No. 2003-331051).

SUMMARY OF THE INVENTION

With the business of renting out the illumination apparatuses in mind, it would be appropriate in terms of an utilization rate to be able to determine at an early stage whether an illumination apparatus that is currently rented out satisfies a requirement from another customer (whether it can be rented out to another customer after the expiration of a rental contract).

Accordingly, it is an object of the present invention to provide an illumination apparatus management system capable of determining at an early stage whether an illumination apparatus that is currently rented out satisfies a requirement from another customer.

An illumination apparatus management system according to one aspect of the present invention includes a plurality of illumination apparatuses, and a server. Each of the plurality of illumination apparatuses transmits a status of use of the illumination apparatus to the server. The server includes: a first obtaining unit configured to obtain the status of use of the illumination apparatus transmitted by each of the plurality of illumination apparatuses; a second obtaining unit configured to obtain a requirement from a user; and a selector that selects an illumination apparatus matching the requirement obtained by the second obtaining unit from among the plurality of illumination apparatuses based on the status of use obtained by the first obtaining unit, and outputs a selection result indicating the illumination apparatus that has been selected.

An information communication terminal according to one aspect of the present invention is an information communication terminal communicating with a server that manages a plurality of illumination apparatuses, selects an illumination apparatus matching a requirement from among the plurality of illumination apparatuses based on a status of use of each of the plurality of illumination apparatuses obtained from the illumination apparatus, and outputs a selection result indicating the illumination apparatus that has been selected. The information communication terminal includes: an entry receiver that receives an entry of the requirement from a user; a communication unit configured to transmit the requirement received by the entry receiver to the server, and receive the selection result from the server; and a display unit configured to display the selection result received by the communication unit.

With the illumination apparatus management system, etc., according to one aspect of the present invention, it is possible to determine at an early stage whether an illumination apparatus that is currently rented out satisfies a requirement from another customer.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 illustrates exemplary contents of information stored in a storage device according to Embodiment 1;

DETAILED DESCRIPTION OF THE PREFERRED EMBODIMENTS

In the following, an illumination apparatus management system and an information communication terminal according to embodiments will be described, with reference to the accompanying drawings. It should be noted that the embodiments described below will illustrate one specific example of the present invention. Thus, the numerical values, shapes, materials, structural components, the arrangement and connection of the structural components mentioned in the following embodiments are merely an example and not intended to limit the present invention. Accordingly, among the structural components in the following embodiments, the one that is not recited in any independent claim exhibiting the most generic concept of the present invention will be described as an arbitrary structural component.

Incidentally, each of the figures is a schematic view and not necessarily illustrated in a strict manner. Furthermore, in each of the figures, substantially the same structures are assigned the same reference signs, and the redundant description of such structures will be omitted or simplified in some cases.

(Embodiment 1)

[Outline of Illumination Apparatus Management System]

Figure 1:
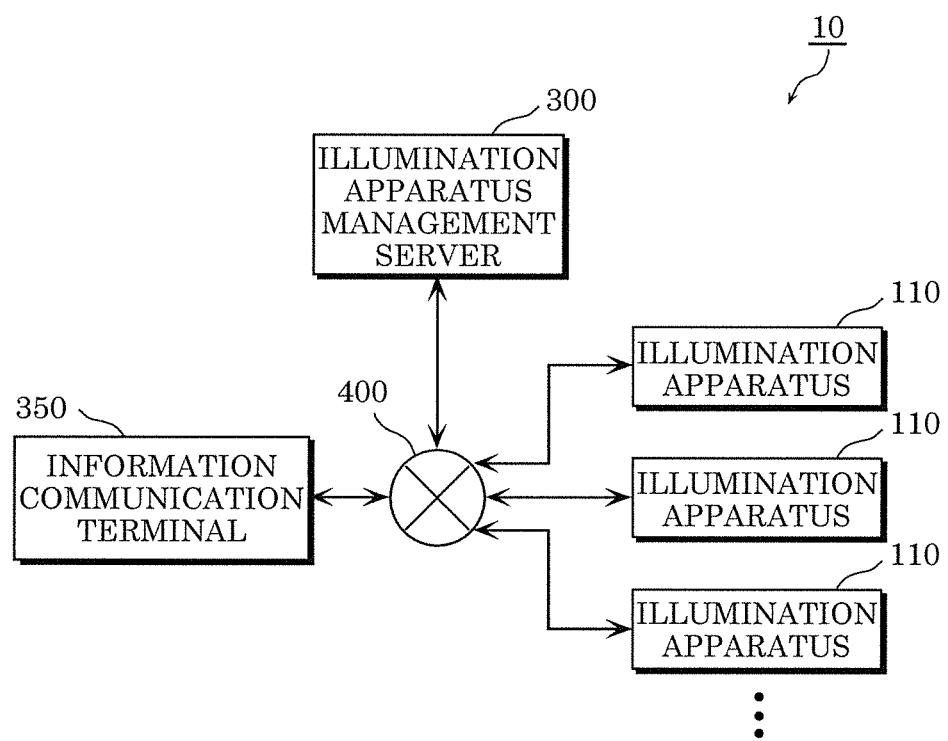
FIG. 1 is a block diagram illustrating a schematic configuration of an illumination apparatus management system according to Embodiment 1.

First, an outline of an illumination apparatus management system according to Embodiment 1 will be described. FIG. 1 is a block diagram illustrating a schematic configuration of the illumination apparatus management system according to Embodiment 1.

Illumination apparatus management system 10 illustrated in FIG. 1 includes a plurality of illumination apparatuses 110, information communication terminal 350, and illumination apparatus management server 300.

Illumination apparatus management system 10 is a system assuming a business of renting out the plurality of illumination apparatuses 110. The plurality of illumination apparatuses 110 are installed in a building or the like to which illumination apparatuses 110 are rented out, or stockpiled at a warehouse or the like of a rental dealer.

Although illumination apparatus management system 10 actually includes three or more illumination apparatuses 110, FIG. 1 illustrates only three illumination apparatuses 110 for simplicity. Incidentally, although illumination apparatuses having a different specification may be actually included in the plurality of illumination apparatuses provided in illumination apparatus management system 10, they also have a basic configuration similar to illumination apparatus 110. Thus, in Embodiment 1, those illumination apparatuses are all described as illumination apparatuses 110 for simplicity of description.

Information communication terminal 350 is a terminal used by an agent that a customer contacts. Here, in illumination apparatus management system 10, the customer is assumed to be a store in a commercial facility, a factory, an office or the like. Although FIG. 1 illustrates only one information communication terminal 350, illumination apparatus management system 10 actually includes a plurality of information communication terminals 350, which are installed at individual business operations (stores) of the agent.

Illumination apparatus management server 300 is a server operated by the rental dealer (for example, a manufacturer of illumination apparatus 110).

Furthermore, in illumination apparatus management system 10, information communication terminal 350, illumination apparatus management server 300 and illumination apparatus 110 can communicate with each other via Internet 400.

In illumination apparatus management system 10 as described above, an employee at the agent enters a requirement from the customer in information communication terminal 350, and searches for illumination apparatus 110 that matches the requirement. Illumination apparatus management server 300 obtains from each of the plurality of illumination apparatuses 110 a status of use (degree of use) of the illumination apparatus. Then, illumination apparatus management server 300 selects illumination apparatus 110 that matches the requirement from among the plurality of illumination apparatuses 110 based on the obtained status of use, and transmits a selection result indicating illumination apparatus 110 that has been selected to information communication terminal 350. As the selection result, information communication terminal 350 displays a list of illumination apparatuses 110 that match the requirement.

In this manner, illumination apparatus management server 300 directly obtains from each of the plurality of illumination apparatuses 110 the status of use of that illumination apparatus 110. This allows the employee at the agent to determine at an early stage whether the illumination apparatus that is currently rented out satisfies the requirement from another customer, thereby enhancing the utilization rate of illumination apparatus 110.

[Configuration of Each Apparatus]

Figure 2:
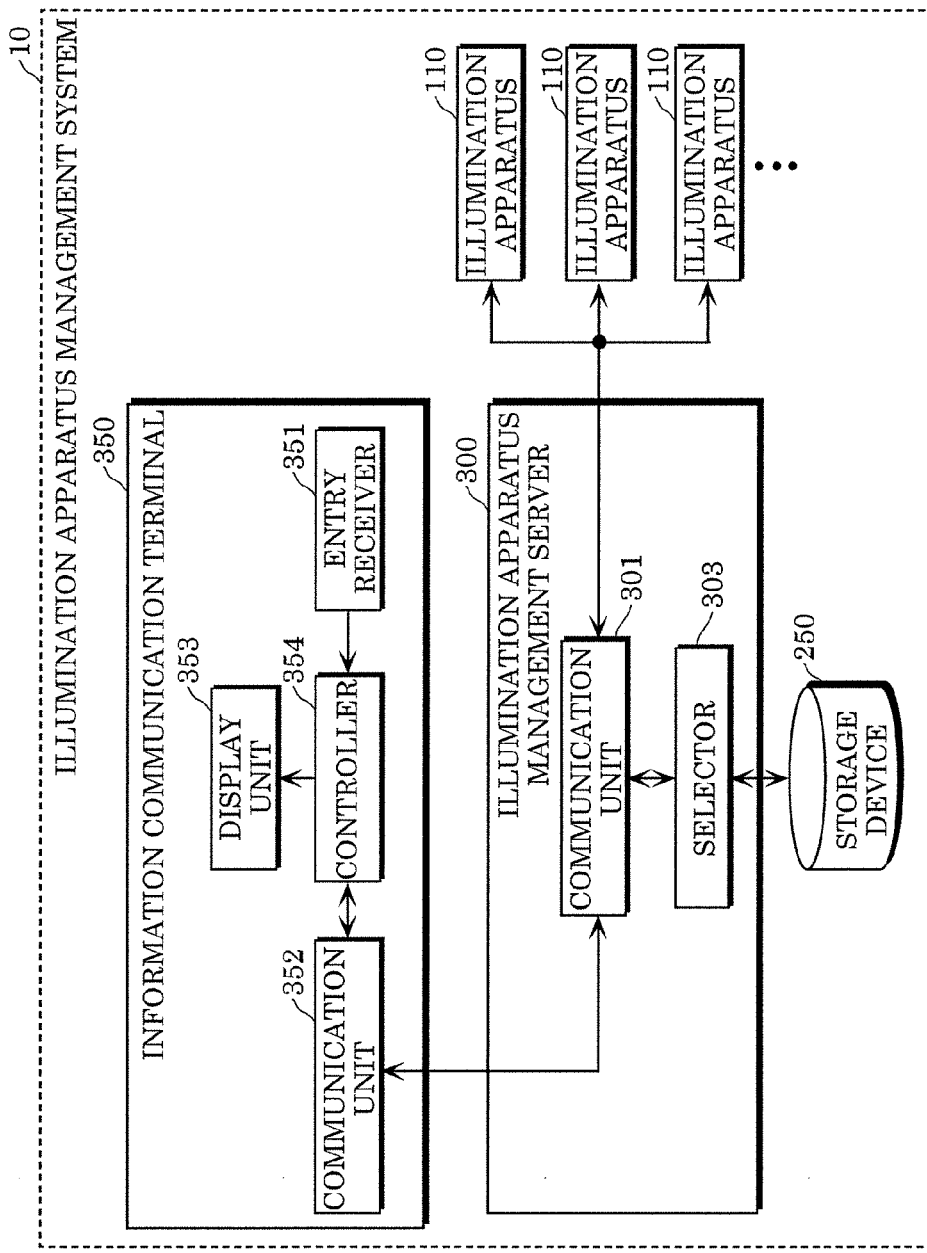
FIG. 2 is a functional block diagram illustrating the illumination apparatus management system according to Embodiment 1.

Now, the configuration of each apparatus in illumination apparatus management system 10 will be described. FIG. 2 is a functional block diagram illustrating illumination apparatus management system 10.

More specifically, illumination apparatus management system 10 illustrated in FIG. 2 includes not only the plurality of illumination apparatuses 110, information communication terminal 350, and illumination apparatus management server 300 but also storage device 250.

First, the description will be directed to illumination apparatus management server 300.

Illumination apparatus management server 300 includes communication unit 301 (a first obtaining unit and a second obtaining unit) and selector 303.

Communication unit 301 obtains the status of use of illumination apparatus 110 transmitted from each of the plurality of illumination apparatuses 110. In other words, communication unit 301 functions as the first obtaining unit.

The status of use of illumination apparatus 110 obtained by communication unit 301 is, for example, cumulative lighting time (a cumulative amount of time for which light-emitting portion 120 of illumination apparatus 110 stays lit up). It should be noted that the status of use includes parameters (brightness, color temperature, etc.) of illumination apparatus 110 that vary according to the status of use.

Also, communication unit 301 obtains the requirement from the customer (user). In other words, communication unit 301 functions as the second obtaining unit.

The requirement from the customer obtained by communication unit 301 includes, for example, a model (product number), a color temperature, wattage (power consumption), a form of luminaire, an expected period of use, cumulative lighting time, brightness, a term of contract, a total amount of payment (rental price multiplied by term of contract), delivery time, and a lifetime (remaining guarantee lighting period) of illumination apparatus 110.

Communication unit 301 is a communication module for communicating with illumination apparatus 110 and information communication terminal 350 via Internet 400, for example. It should be noted that communication unit 301 may be constituted by two communication modules, namely, a communication module functioning as the first obtaining unit and a communication module functioning as the second obtaining unit.

Selector 303 selects illumination apparatus 110 that matches the requirement obtained by communication unit 301 from among the plurality of illumination apparatuses 110 based on the status of use obtained by communication unit 301, and outputs a selection result indicating illumination apparatus 110 that has been selected.

More specifically, selector 303 receives, via communication unit 301, the status of use periodically transmitted from the plurality of illumination apparatuses 110, and stores (updates) the received status of use in storage device 250. At this time, selector 303 receives an ID of illumination apparatus 110 (identification information for identifying illumination apparatus 110) together with the status of use.

It should be noted that the status of use of the plurality of illumination apparatuses 110 may be received from a device other than the plurality of illumination apparatuses 110. For example, selector 303 may receive the status of use of the plurality of illumination apparatuses 110 from information communication terminal 350 via communication unit 301. In this case, the status of use of the plurality of illumination apparatuses 110 is entered in information communication terminal 350 by a user's operation of information communication terminal 350. Also, the status of use of the plurality of illumination apparatuses 110 may be updated by illumination apparatus management server 300. In this case, illumination apparatus management server 300 includes an input means, and updates the above-mentioned status of use using this input means.

On the other hand, the status of use in storage device 250 is associated with the ID of illumination apparatus 110 that has transmitted that status of use. Thus, when communication unit 301 receives the status of use, selector 303 updates the status of use that is stored in storage device 250 and associated with the ID received with that status of use.

Then, when communication unit 301 obtains the requirement, selector 303 refers to storage device 250, selects the ID of illumination apparatus 110 that matches the requirement, and outputs (transmits) a selection result, which is information containing the selected ID, to information communication terminal 350 via communication unit 301. More specifically, selector 303 may be implemented by a microcomputer, a processor, a dedicated circuit or the like.

Now, information communication terminal 350 will be described.

Information communication terminal 350 includes entry receiver 351, communication unit 352, display unit 353, and controller 354.

Information communication terminal 350 may be an information communication terminal having a communication function such as a personal computer, a smartphone, and a tablet terminal.

Entry receiver 351 may be an input interface that receives an entry of the requirement from the customer (user). More specifically, entry receiver 351 may be a mouse, a keyboard, a touch panel or the like.

Communication unit 352 transmits the requirement received by entry receiver 351 to communication unit 301 of illumination apparatus management server 300. Also, communication unit 352 receives a selection result from communication unit 301 of illumination apparatus management server 300.

Display unit 353 displays the selection result received by communication unit 352. For example, display unit 353 may be a display panel such as a liquid crystal panel, an organic electro luminescence (EL) panel, or the like.

Controller 354 controls information transmission and reception performed by communication unit 352 and image display performed by display unit 353. More specifically, controller 354 may be implemented by a microcomputer, a processor, a dedicated circuit or the like.

Now, the description will be directed to storage device 250.

Storage device 250 is a storage device (database) in which the status of use received by communication unit 301 is associated with at least the ID of illumination apparatus 110 and stored.

In storage device 250, the status of use of illumination apparatus 110 (the cumulative lighting time in Embodiment 1) is associated with static and dynamic information of illumination apparatus 110 such as the ID of illumination apparatus 110 mentioned above. FIG. 3 illustrates exemplary contents of information stored in storage device 250.

The static information is information that is intrinsic to illumination apparatus 110 and is not updated, for example, the ID of illumination apparatus 110, the model of illumination apparatus 110, an initial color temperature, and initial brightness illustrated in FIG. 3. It should be noted that other examples of the static information include a manufacturing plant, a production lot, a rated power consumption (wattage), and dimension.

On the other hand, the dynamic information is information that is updated on an ex-post basis after illumination apparatus 110 is rented out, for example, a lease period (rental period), an installation site, and price illustrated in FIG. 3.

Moreover, storage device 250 stores information indicating luminous flux decline rate curve. In other words, the luminous flux decline rate curve is a curve indicating a relationship between luminous flux (brightness) and cumulative lighting time, and is used for calculating current brightness from the cumulative lighting time. It should be noted that, other than the above, storage device 250 may store information about a curve indicating a relationship between the color temperature and the cumulative lighting time, or the like.

Storage device 250 may be implemented by a hard disc drive (HDD), a semiconductor memory, or the like. Incidentally, storage device 250 may be incorporated into illumination apparatus management server 300. Put another way, illumination apparatus management server 300 may include storage device 250.

Figure 4:
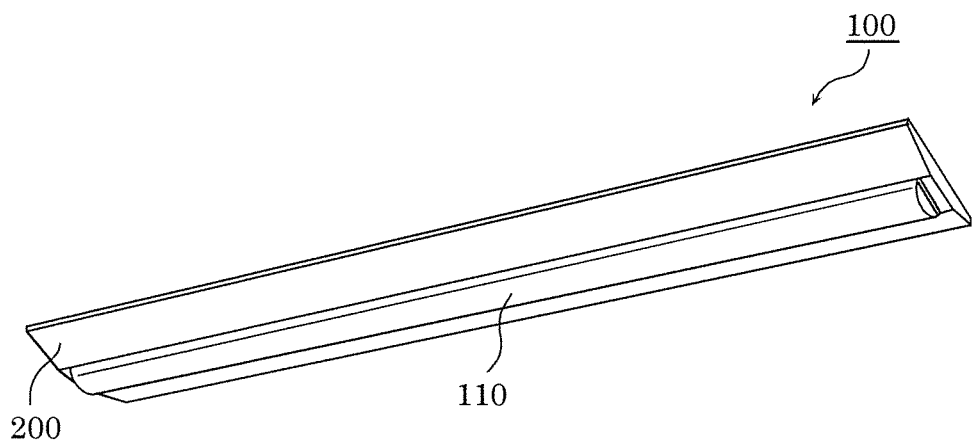
FIG. 4 is a perspective view illustrating an external appearance of a luminaire according to Embodiment 1.
Figure 5:
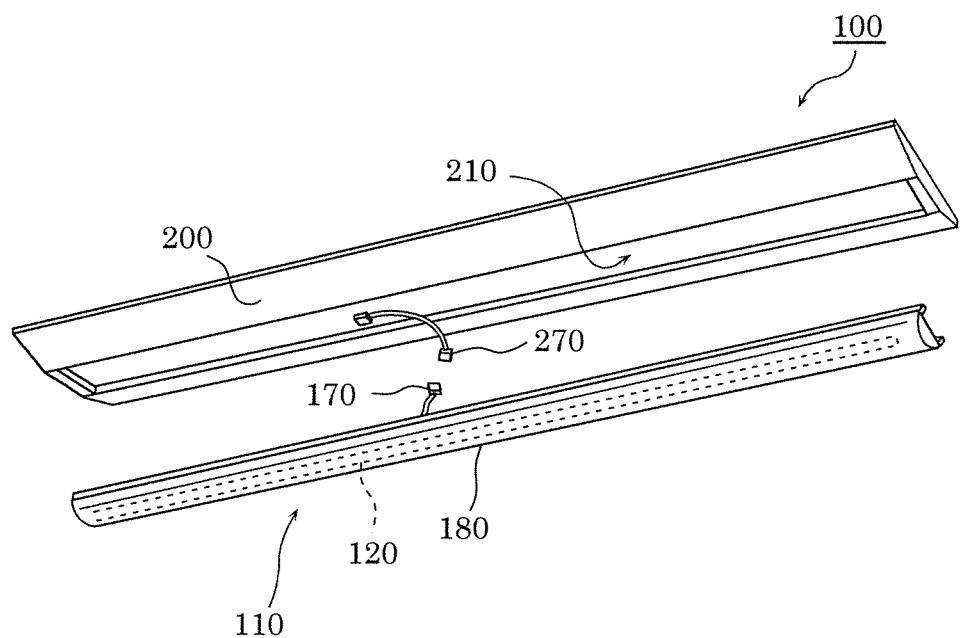
FIG. 5 is an exploded perspective view illustrating the luminaire according to Embodiment 1.

Next, illumination apparatus 110 (a luminaire including illumination apparatus 110) will be described. FIG. 4 is a perspective view illustrating an external appearance of a luminaire according to Embodiment 1. FIG. 5 is an exploded perspective view illustrating the luminaire according to Embodiment 1. It should be noted that the following description is directed to a basic configuration of illumination apparatus 110 and that the plurality of illumination apparatuses 110 may include an illumination apparatus having a different specification as described above.

As illustrated in FIG. 4 and FIG. 5, luminaire 100 according to Embodiment 1 includes illumination apparatus 110 and luminaire body 200.

Luminaire body 200 is a member serving as a base of luminaire 100, and is fixed to a ceiling by a bolt and a nut, for example. Luminaire body 200 has recess 210 in which illumination apparatus 110 is buried. For example, metal fittings (not shown) provided in illumination apparatus 110 fit into a hole formed on an internal surface of recess 210, whereby illumination apparatus 110 is removably attached to luminaire body 200.

Incidentally, as long as illumination apparatus 110 can be removably attached to luminaire body 200, various techniques can be adopted for such an attachment. For example, illumination apparatus 110 may be attached to luminaire body 200 using a fastening member such as a screw.

Furthermore, connector 270 is provided in an end portion of an electric wire extending from luminaire body 200, and connector 170 is provided in an end portion of an electric wire extending from illumination apparatus 110. These connector 270 and connector 170 are fitted together, whereby electric power necessary for light emission of illumination apparatus 110 is supplied from luminaire body 200 to illumination apparatus 110.

When operations of turning on, turning out, and dimming illumination apparatus 110 are performed through an operation panel installed on a wall, a control line for signal exchange between the operation panel and illumination apparatus 110 is connected to illumination apparatus 110.

Illumination apparatus 110 includes light-emitting portion 120 that emits illumination light, and cover 180 that covers light-emitting portion 120.

Light-emitting portion 120 is a light-emitting module including an LED element as a light source (a light-emitting element). It should be noted that light-emitting portion 120 may include plural kinds of light sources having different emission colors (color temperatures) so as to allow toning control (control of emission color) or dimming control (control of brightness).

Cover 180 is a member that transmits light emitted from light-emitting portion 120. For example, cover 180 may be formed of a transparent glass or a transparent resin. Furthermore, in Embodiment 1, cover 180 has a function of diffusing light emitted from light-emitting portion 120. For example, a resin or a white pigment containing a light diffuser (fine particles) such as silica or calcium carbonate is applied to an internal surface or an external surface of cover 180, so that a milky white light diffusing film is formed on cover 180.

Moreover, cover 180 itself may be formed using a resin material or the like in which a light diffuser is dispersed.

Incidentally, cover 180 need not have the light diffusing function. Cover 180 may be so transparent that an inside can be seen from an outside through cover 180.

Figure 6:
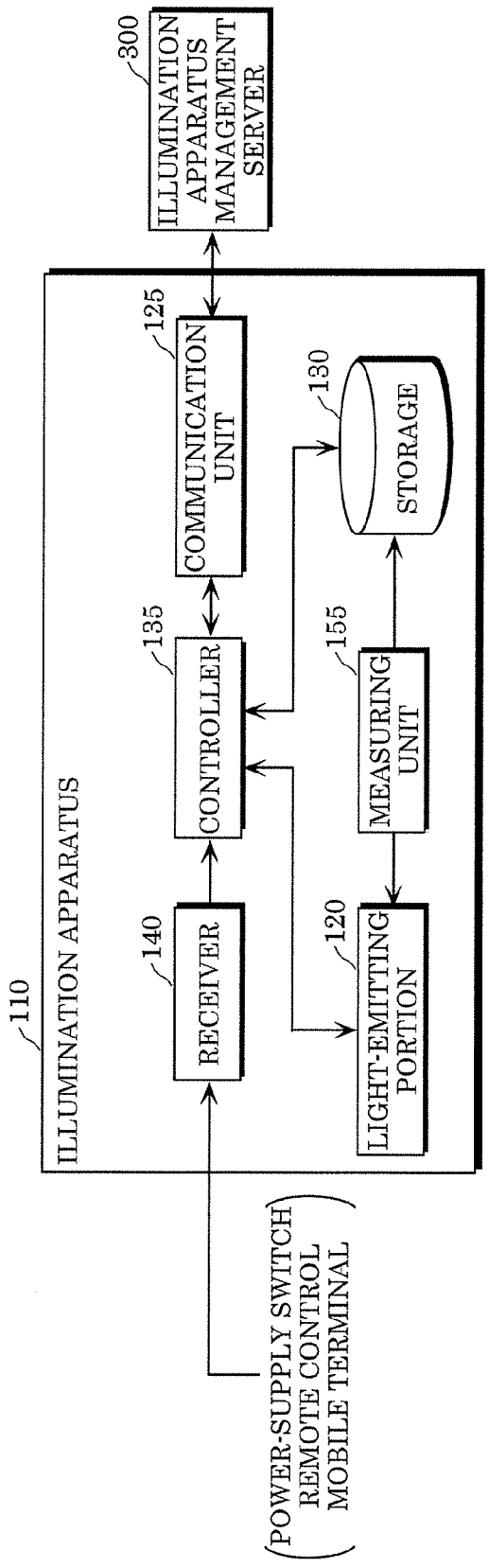
FIG. 6 is a block diagram schematically illustrating a configuration of an illumination apparatus according to Embodiment 1.

Next, referring to FIG. 6, the basic configuration of illumination apparatus 110 according to Embodiment 1 will be described. FIG. 6 is a block diagram schematically illustrating a configuration of illumination apparatus 110 according to Embodiment 1.

As illustrated in FIG. 6, illumination apparatus 110 includes receiver 140, light-emitting portion 120, communication unit 125, storage 130, controller 135, and measuring unit 155.

Receiver 140 receives a predetermined instruction transmitted from an outside of illumination apparatus 110. More specifically, various signals corresponding to various instructions are transmitted from external devices in a wired or wireless manner, and received by receiver 140. For example, receiver 140 may be implemented by receiving equipment at least capable of receiving a signal.

Examples of the devices that transmit various signals to receiver 140 include a power-supply switch for turning on and off a power supply of (turning on and out) illumination apparatus 110, a remote control that transmits a signal by infrared radiation, and a mobile terminal such as a mobile phone or a tablet terminal.

Additionally, an operation panel that includes a power-supply switch, a switch for dimming or toning, etc., and is attached to the wall of a room in which luminaire 100 is installed also serves as an example of the devices transmitting various signals to receiver 140.

Communication unit 125 is a communication module for communicating with illumination apparatus management server 300 via Internet 400, for example. More specifically, communication unit 125 transmits the cumulative lighting time (status of use) of illumination apparatus 110 to illumination apparatus management server 300. The cumulative lighting time to be transmitted has been measured by measuring unit 155 and stored in storage 130.

The cumulative lighting time is periodically transmitted at predetermined intervals, for example, but may be transmitted at any timing such as when illumination apparatus 110 is turned on (from light-out to light-on) or in response to a request from illumination apparatus management server 300.

Incidentally, communication apparatuses such as a modem, a router and a relay server are actually present between communication unit 125 and illumination apparatus management server 300.

Storage 130 may be a non-volatile storage device that stores the cumulative lighting time measured by measuring unit 155. Storage 130 also stores information intrinsic to illumination apparatus 110 such as the ID of illumination apparatus 110. Storage 130 may be, for example, a semiconductor memory such as a flash memory or an electrically erasable programmable read-only memory (EEPROM). Incidentally, storage 130 may be provided in controller 135.

Controller 135 controls turning on or out of light-emitting portion 120. Furthermore, controller 135 reads out the cumulative lighting time stored in storage 130, and causes communication unit 125 to transmit the read-out cumulative lighting time. When light-emitting portion 120 deals with dimming and toning, controller 135 performs dimming control and toning control. Controller 135 may be implemented by a microcomputer, a processor or a dedicated circuit that controls a value of an electric current supplied to light-emitting portion 120 according to the input signal, for example.

Measuring unit 155 measures the cumulative lighting time of light-emitting portion 120. Measuring unit 155 is implemented by a microcomputer incorporated in a power supply portion (not shown) included in illumination apparatus 110, for example, but may be implemented as one function of controller 135. In Embodiment 1, the cumulative lighting time measured by measuring unit 155 is stored in storage 130. It should be noted that measuring unit 155 may measure the brightness or color temperature of light-emitting portion 120. In this case, measuring unit 155 includes a sensor that measures the brightness or color temperature.

[Operation of Illumination Apparatus Management System]

Figure 7:
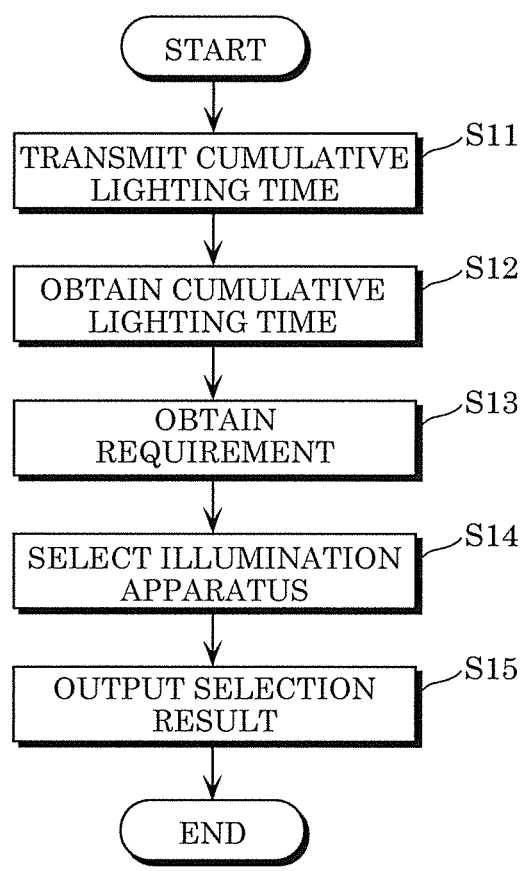
FIG. 7 is a flowchart of an operation of the illumination apparatus management system according to Embodiment 1.

The following is a description of an operation of illumination apparatus management system 10 configured as above. FIG. 7 is a flowchart of the operation of illumination apparatus management system 10.

As mentioned earlier, communication unit 125 included in each of the plurality of illumination apparatuses 110 periodically transmits cumulative lighting time (S11), and communication unit 301 of illumination apparatus management server 300 obtains (receives) the cumulative lighting time transmitted from a plurality of communication units 125 (S12). The cumulative lighting time obtained by communication unit 301 is stored in storage device 250 by selector 303.

Here, when communication unit 352 of information communication terminal 350 transmits a requirement, communication unit 301 obtains (receives) this requirement (S13). Selector 303 refers to storage device 250, and selects illumination apparatus 110 that matches the requirement obtained by communication unit 301 from among the plurality of illumination apparatuses 110 (S14).

Then, selector 303 outputs a selection result indicating illumination apparatus 110 that has been selected (S15). Communication unit 301 transmits the outputted selection result to communication unit 352 of information communication terminal 350.

The selection result is displayed in display unit 353 of information communication terminal 350. When illumination apparatus 110 to be rented out to a customer is determined, a rental contract of illumination apparatus 110 is concluded, followed by arrangements for illumination apparatus 110 to be rented out.

Figure 8:
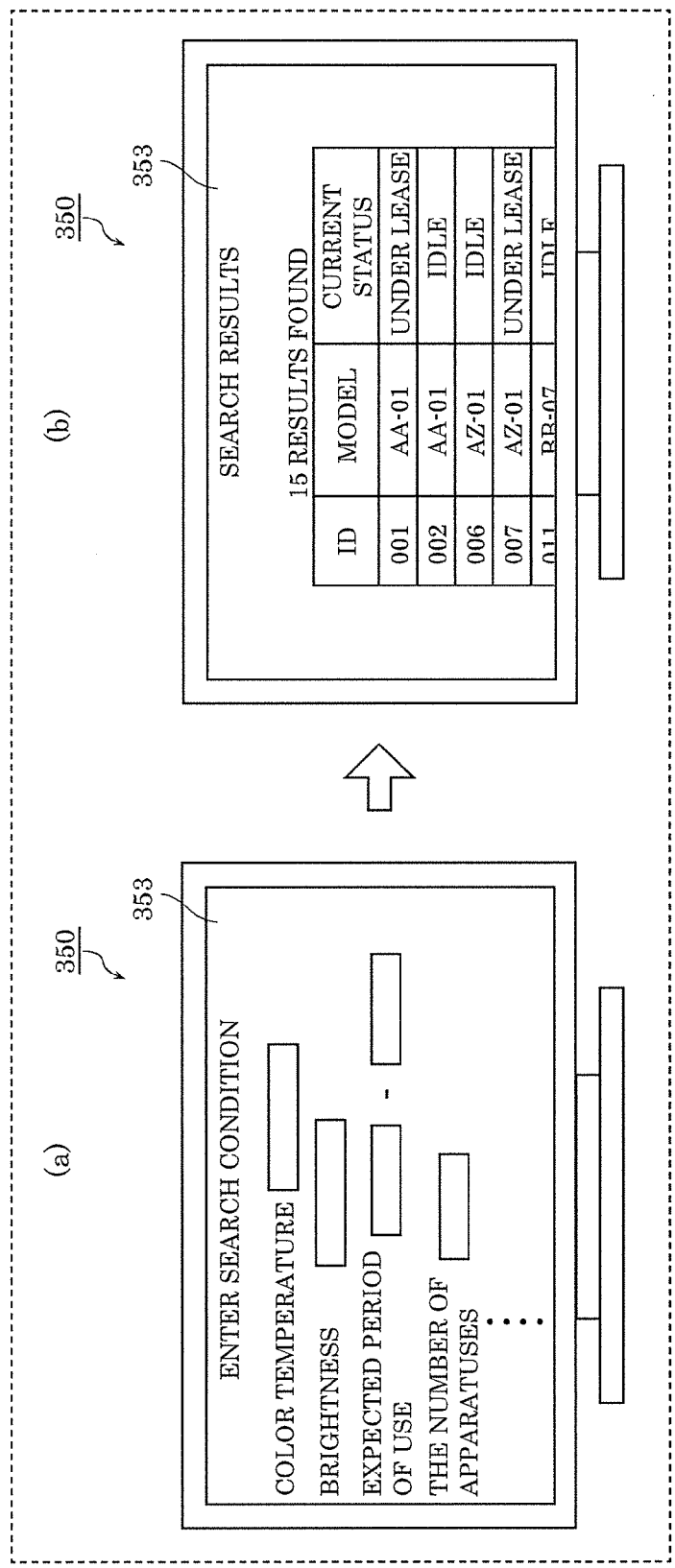
FIG. 8 is a drawing for describing an example of a display screen of an information communication terminal according to Embodiment 1.

Now, the following is a description of display screens to be displayed in display unit 353 of information communication terminal 350 in the operation of illumination apparatus management system 10 described above. FIG. 8 is a drawing for describing an example of the display screen of information communication terminal 350.

First, (a) in FIG. 8 illustrates an example of the display screen when a requirement is entered in information communication terminal 350, specifically, entry receiver 351 (an entry screen). At this time, the entry screen for values such as the color temperature, the brightness, the expected period of use, and the number of apparatuses (quantity) is displayed in display unit 353. In the entry screen, the above-noted values such as the color temperature may be specified directly or may be selectable from a pull-down menu. Furthermore, in the entry screen, a range (at least one of an upper limit and a lower limit) of the above-noted values such as the color temperature may be specified. Moreover, it may also be possible to specify whether illumination apparatus 110 has a toning function and whether illumination apparatus 110 has a dimming function.

Then, (b) in FIG. 8 illustrates an example of the display screen of search results (the selection result of selector 303). As illustrated in (b) of FIG. 8, after the requirement is entered, a list of illumination apparatuses 110 that match the requirement is displayed in display unit 353 as the selection result of selector 303.

It should be noted that the display screen of display unit 353 is not limited to the above. For example, the display screen when the requirement is entered (i.e., (a) in FIG. 8) may be an entry screen for the above-mentioned information (dynamic information and static information) stored in storage device 250.

Additionally, the display screen displaying the search results may display expected brightness and color temperature, which will be described later. Furthermore, the display screen displaying the search results may display the status of use of illumination apparatus 110 that has been selected. In other words, the selection result may include information indicating either one of the cumulative lighting time and the lifetime of illumination apparatus 110 that has been selected. Display unit 353 may display the selection result including either one of the cumulative lighting time and the lifetime of illumination apparatus 110 that has been selected. The cumulative lighting time in this case may be cumulative lighting time at the time of searching or may be expected cumulative lighting time at the beginning of the expected period of use.

Incidentally, in the case where the requirement includes period information (for example, the expected period of use), the selection result may include information indicating that the selected illumination apparatus satisfies the requirement by the end of the period. In this case, display unit 353 displays the selection result containing the information indicating that illumination apparatus 110 that has been selected satisfies the requirement by the end of the period.

[Prediction of Brightness Based on Cumulative Lighting Time]

For example, when a customer rents a plurality of illumination apparatuses 110 and evenly illuminates a single space using the rented plurality of illumination apparatuses 110, it is appropriate that the brightness of the plurality of illumination apparatuses 110 fall within a predetermined range. However, since illumination apparatuses 110 to be rented out have statuses of use different from each other, the brightness among them will not be even at a future point in time.

On the other hand, in the rental business of illumination apparatus 110, the utilization rate need be raised by finding the next customer to rent out illumination apparatus 110 at an early stage.

Thus, selector 303 predicts an illumination state (for example, brightness, a color temperature or the like) of the plurality of illumination apparatuses 110 at a future point in time (hereinafter, also referred to as a target point in time) from the status of use obtained by communication unit 301 (first obtaining unit). Then, selector 303 selects illumination apparatus 110 having the predicted illumination state that matches the illumination state specified by the requirement from among the plurality of illumination apparatuses 110.

In Embodiment 1, the status of use obtained by communication unit 301 is the cumulative lighting time of illumination apparatus 110. On the other hand, the requirement is information specifying the brightness of illumination apparatus 110 at a target point in time. Selector 303 predicts the brightness of the plurality of illumination apparatuses 110 at the target point in time from the cumulative lighting time obtained by communication unit 301 (first obtaining unit).

More specifically, selector 303 first uses an hour of use (lighting time) of illumination apparatus 110 from the beginning of the rental to the present so as to predict (for example, linearly predict) an hour of use from the present to the target point in time. Next, the brightness of illumination apparatus 110 when the predicted hour of use is added to the cumulative lighting time obtained by communication unit 301 is predicted with reference to information indicating the luminous flux decline rate curve stored in storage device 250. Then, selector 303 selects illumination apparatus 110 having the predicted brightness that matches the brightness specified by the requirement from among the plurality of illumination apparatuses 110. It should be noted that the predicted brightness may be associated with an ID of illumination apparatus 110 and stored in storage device 250.

By predicting the brightness at a future point in time as described above, it is possible to determine at an early stage whether illumination apparatus 110 that is currently rented out satisfies a requirement from another customer.

When the illumination apparatus management system is used for the rental business as in Embodiment 1, illumination apparatus 110 to be selected by selector 303 need be the one whose lease period (rental period) stored in storage device 250 is scheduled to expire by the target point in time.

Incidentally, when information about a curve indicating a relationship between the color temperature and the cumulative lighting time is stored in storage device 250, the color temperature of illumination apparatus 110 may be predicted from the cumulative lighting time similarly to the brightness. In this case, the requirement is information specifying the color temperature of illumination apparatus 110 at the target point in time. Selector 303 predicts the color temperature of the plurality of illumination apparatuses 110 at the target point in time from the cumulative lighting time obtained by communication unit 301 (first obtaining unit). Then, selector 303 selects illumination apparatus 110 having the predicted color temperature that matches the color temperature specified by the requirement from among the plurality of illumination apparatuses 110.

By predicting the color temperature at a future point in time as described above, it is possible to determine at an early stage whether illumination apparatus 110 that is currently rented out satisfies a requirement from another customer.

Also, the number of rental illumination apparatuses 110 (the number of illumination apparatuses 110 to be rented out) is sometimes specified by a customer as described above. In such a case, communication unit 301 (second obtaining unit) further obtains quantity information specifying the number of illumination apparatuses 110. The quantity information is entered through information communication terminal 350 (entry receiver 351).

Then, selector 303 selects illumination apparatus 110 that matches the requirement obtained by communication unit 301 (second obtaining unit) based on the status of use obtained by communication unit 301 (first obtaining unit). More specifically, selector 303 selects at least as many illumination apparatuses 110 matching the requirement as the number specified by the quantity information obtained by communication unit 301 (second obtaining unit) from among the plurality of illumination apparatuses 110.

Consequently, illumination apparatus management server 300 can present at least the specified quantity of illumination apparatuses 110 matching the requirement.

[Variations of Selection Made by Selector]

There are various ways of how selector 303 selects illumination apparatus 110, including the one not using the above-described status of use.

For example, selector 303 may preferentially select illumination apparatus 110 that can be delivered to the customer at an early stage. More specifically, selector 303 may output a selection result in which illumination apparatuses 110 are rearranged in a descending order from earliest delivery to the customer. In this case, selector 303 predicts a moving period according to a distance from an installation site of illumination apparatus 110 that is currently rented out to an installation site of illumination apparatus 110 planned by the customer (the planned installation site is entered from information communication terminal 350, for example). Then, selector 303 may calculate delivery time by considering the predicted moving period and output the selection result in which illumination apparatuses 110 are rearranged in a descending order from shortest delivery time. Incidentally, when the number of illumination apparatuses 110 is entered in information communication terminal 350, it may be possible to preferentially select illumination apparatus 110 that can be delivered to the customer at an early stage.

Also, selector 303 may preferentially select illumination apparatus 110 that is in stock (idle). For example, when the number of illumination apparatuses 110 is entered in information communication terminal 350, it may be possible to select illumination apparatus 110 matching the requirement from among illumination apparatuses 110 that are currently rented out if the required number of illumination apparatuses 110 matching the requirement cannot be obtained from those in stock.

Incidentally, if the required number of illumination apparatuses 110 matching the requirement cannot be obtained, selector 303 may place an order with a manufacturer of illumination apparatus 110 for illumination apparatus 110 matching the requirement. More specifically, selector 303 may transmit an order command via communication unit 301 to a server of the manufacturer of illumination apparatus 110. In this way, illumination apparatus 110 that is received according to the order can be rented out.

Furthermore, for example, selector 303 may select an alternative to illumination apparatus 110 that is currently used by the customer (illumination apparatus 110 that is currently rented out). In this case, the model or the like of illumination apparatus 110 that is currently used by the customer is entered in information communication terminal 350 as the requirement. When the product number of the alternative to illumination apparatus 110 is stored in storage device 250 in advance, selector 303 selects illumination apparatus 110 having the product number of the alternative indicated by the entered model. When the product number of the alternative is not stored, illumination apparatus 110 having the color temperature or brightness similar to the entered color temperature or brightness is selected. More specifically, for example, selector 303 calculates a score that increases with a decrease in difference between every one of parameters (color temperature, brightness, etc.) of illumination apparatus 110 and the entered value, and selects as alternative illumination apparatus 110 having a total of scores calculated for the individual parameters greater than a predetermined value.

Moreover, when there are the required number or more of illumination apparatuses 110 satisfying the requirement, selector 303 may further determine a combination of illumination apparatuses 110 as many as the required number of illumination apparatuses 110. At this time, the combination of illumination apparatuses 110 may be determined, for example, so that a rental cost is minimized or power consumption (electricity charge) is minimized.

How to determine the combination at this time may be specified through information communication terminal 350. Also, there is an estimated case in which a current rental cost of the customer or a current power consumption (power charge) of the customer is entered through information communication terminal 350. In such a case, selector 303 may include in the selection result a change in cost (for example, an increase of X amount of yen) with respect to the combination of the illumination apparatuses that are currently rented out if the combination of illumination apparatuses 110 selected by selector 303 was rented. In other words, display unit 353 may display how the cost changes.

Furthermore, selector 303 may automatically select the combination of illumination apparatuses 110 according to a size of a space (a room) in which illumination apparatus 110 is to be installed or a use of illumination apparatus 110 (a use at an office, a use at a distribution outlet or a use at a restaurant, etc.). In this case, the size of the space or the use is entered in information communication terminal 350 as the requirement. The size of the space can be specified by entering dimensions on a simplified floor plan displayed in display unit 353, for example.

In this case, storage device 250 stores in advance information about required brightness according to the size of the space or information about appropriate brightness (a desired color temperature) according to the use. By referring to storage device 250, selector 303 can select the combination of illumination apparatuses 110 according to the size of the space in which illumination apparatus 110 is to be installed or the use of illumination apparatus 110.

When the floor plan is displayed in display unit 353 as described above, it is also possible to specify that one portion of the displayed floor plan has brightness different from brightness of the other portion.

[Supplementary Explanation 1. Collection and Service of Illumination Apparatus]

Figure 9:
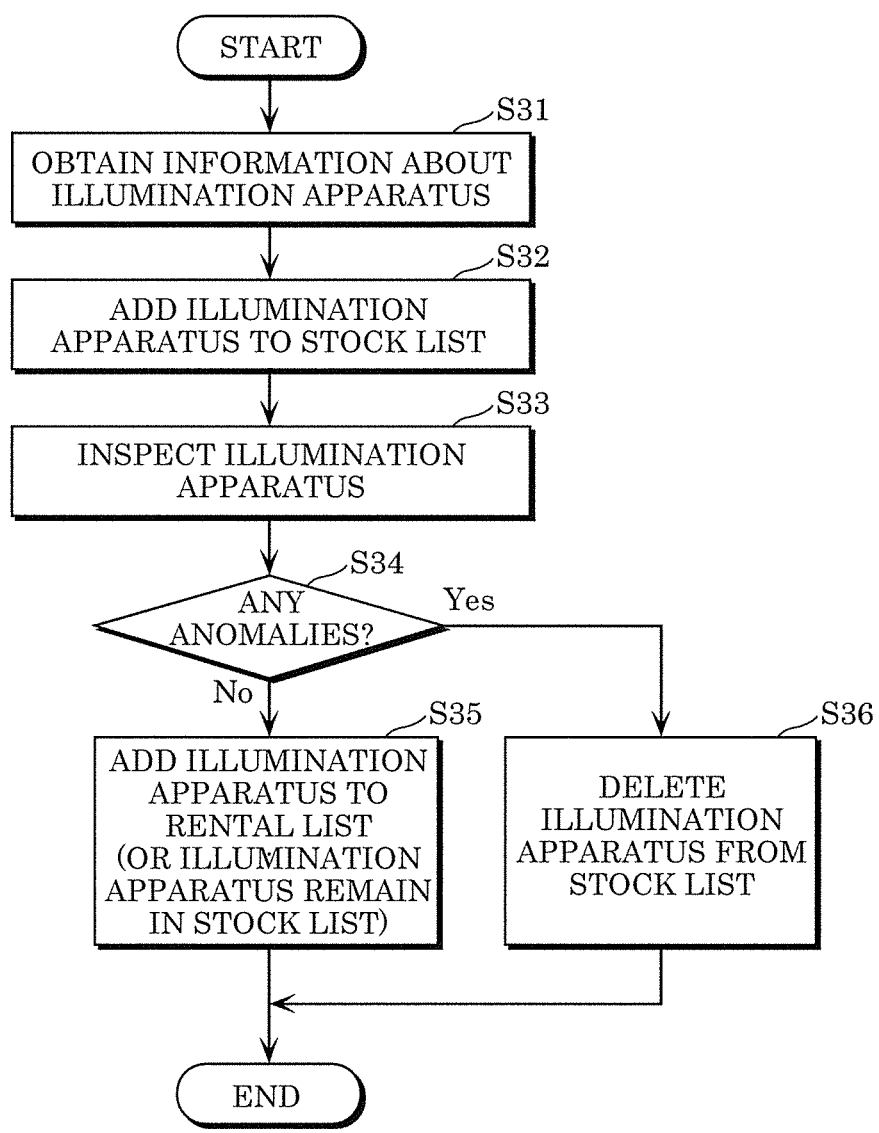
FIG. 9 is a flowchart of a process of collecting an illumination apparatus.

The following is a description of collecting illumination apparatus 110 whose rental period has expired. FIG. 9 is a flowchart of a process of collecting illumination apparatus 110. In the following description, it is assumed that illumination apparatus 110 that is not but can be rented out is added to a stock list in storage device 250 and illumination apparatus 110 that is currently rented out is added to a rental list.

First, illumination apparatus management server 300 obtains information (for example, an ID or the like) about illumination apparatus 110 whose rental period has expired (S31), and adds illumination apparatus 110 having the obtained information to the stock list (S32).

It is assumed that illumination apparatus 110 whose rental period has expired is collected by a rental dealer. In this case, the rental dealer inspects illumination apparatus 110 that has been collected (S33), and checks for anomalies (S34). The presence of anomalies are determined based on, for example, whether the cumulative lighting time has exceeded predetermined time, whether the color temperature is insufficient, or whether the brightness is insufficient. Among them, the insufficiencies of the color temperature and brightness of illumination apparatus 110 can be checked for by a lighting test of illumination apparatus 110 (measuring the color temperature and brightness using a measuring instrument) at the time of collection.

If the insufficiencies of the color temperature and brightness of illumination apparatus 110 are found in the lighting test, namely, if it is determined that illumination apparatus 110 has an anomaly (Yes in S34), this illumination apparatus 110 is deleted from the stock list (S36).

If it is determined in the lighting test that illumination apparatus 110 has no anomaly (No in S34), this illumination apparatus 110 is added to the rental list when rented out (S35). Incidentally, when this illumination apparatus 110 is not rented out, it remains in the stock list.

Figure 10:
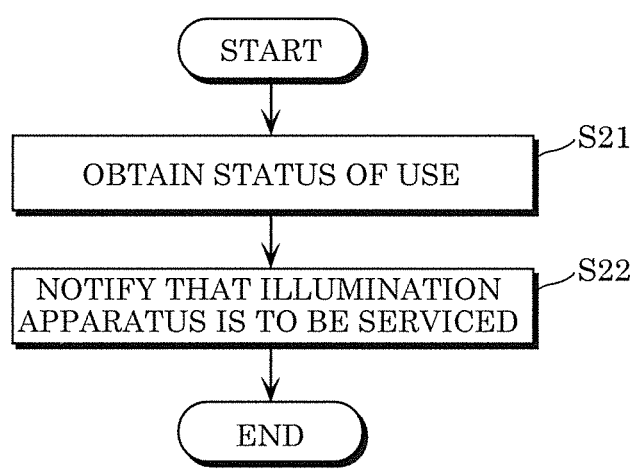
FIG. 10 is a flowchart of an operation of notification of an illumination apparatus to be serviced.

It should be noted that the presence of anomalies of illumination apparatus 110 may be determined in advance based on the status of use transmitted from communication unit 125 of illumination apparatus 110 that is currently rented out. Furthermore, illumination apparatus 110 that has been determined to have an anomaly may be treated as illumination apparatus 110 to be serviced, and illumination apparatus management server 300 may notify information communication terminal 350 that this illumination apparatus 110 is to be serviced. FIG. 10 is a flowchart of an operation of notification of illumination apparatus 110 to be serviced.

Illumination apparatus management server 300 (communication unit 301) obtains the status of use from illumination apparatus 110 (communication unit 125) (S21). Then, if it is determined that this illumination apparatus 110 has an anomaly, illumination apparatus management server 300 notifies information communication terminal 350 that this illumination apparatus 110 is to be serviced (S22). More specifically, illumination apparatus management server 300 notifies information communication terminal 350 of the ID, the installation site and the service details of illumination apparatus 110 that has been determined to be serviced.

For example, if the cumulative lighting time obtained from illumination apparatus 110 exceeds defined time (lifetime), illumination apparatus management server 300 determines that this illumination apparatus 110 has an anomaly. Also, in the case where the information about the color temperature or brightness can be obtained from illumination apparatus 110, illumination apparatus management server 300 determines that this illumination apparatus 110 has an anomaly when the color temperature or brightness of illumination apparatus 110 has changed considerably from its initial value.

This makes it possible to reduce the possibility of a rental reservation made for illumination apparatus 110 determined to have an anomaly.

As described above, illumination apparatus management server selects illumination apparatus 110 determined to have an anomaly from among the plurality of illumination apparatuses 110 based on the status of use of each illumination apparatus 110 obtained from the plurality of illumination apparatuses 110, and outputs the selection result indicating illumination apparatus 110 that has been selected. At this time, the selection result contains information indicating that illumination apparatus 110 indicated by this selection result has an anomaly. Display unit 353 of information communication terminal 350 displays the selection result containing information indicating that illumination apparatus 110 that has been selected has an anomaly.

Typically, illumination apparatus management server 300 determines whether illumination apparatus 110 has an anomaly based on at least one of the cumulative lighting time and the lifetime of illumination apparatus 110. In this case, the selection result contains the information indicating at least one of the cumulative lighting time and the lifetime of illumination apparatus 110 that has been selected. Then, display unit 353 of information communication terminal 350 displays the selection result containing the information indicating that illumination apparatus 110 that has been selected has an anomaly based on at least one of the cumulative lighting time and the lifetime of this illumination apparatus 110.

It should be noted that the following cases other than the above can be listed as examples in which illumination apparatus 110 is to be serviced:

the case where the brightness is insufficient even when an electric current is passed;

the case where a manufacturing plant, a date of manufacture or a lot number indicates that the apparatus is to be collected; and the case where a predetermined period (for example, three or six months) has passed since the last service (maintenance).

[Supplementary Explanation 2. Rental of New Product and Rental of Used Product]

Figure 11:
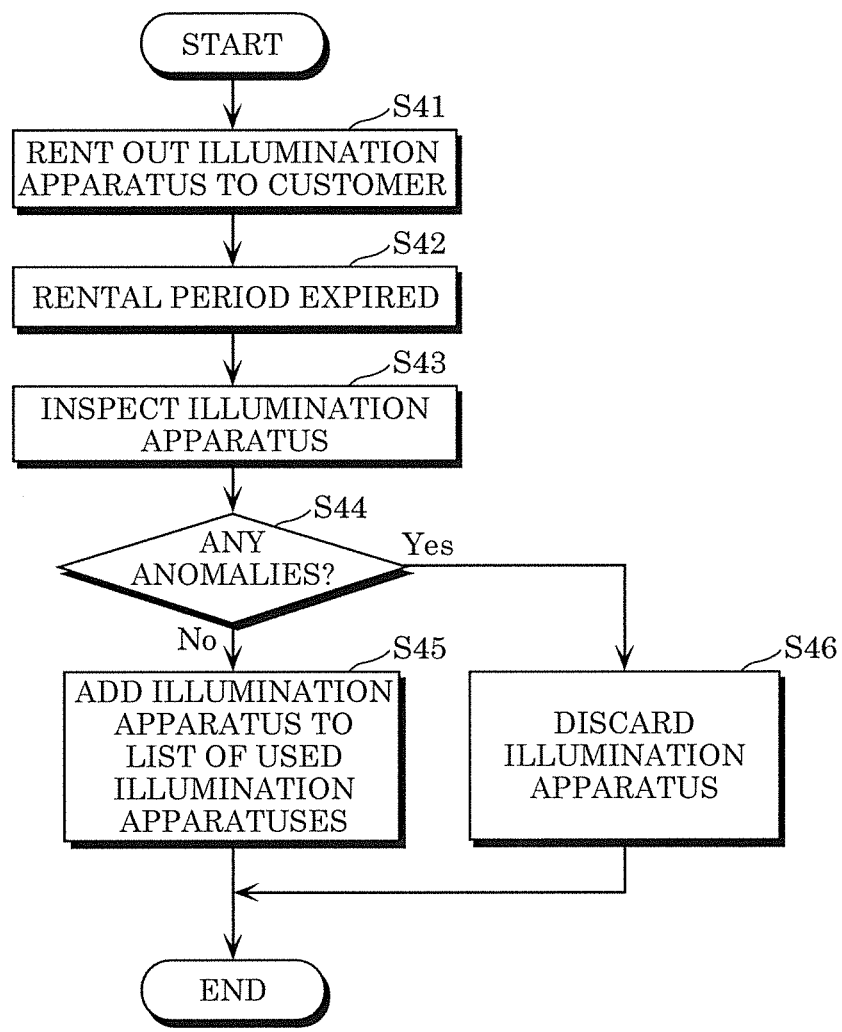
FIG. 11 is a flowchart of an exemplary process of renting out a new illumination apparatus.
Figure 12:
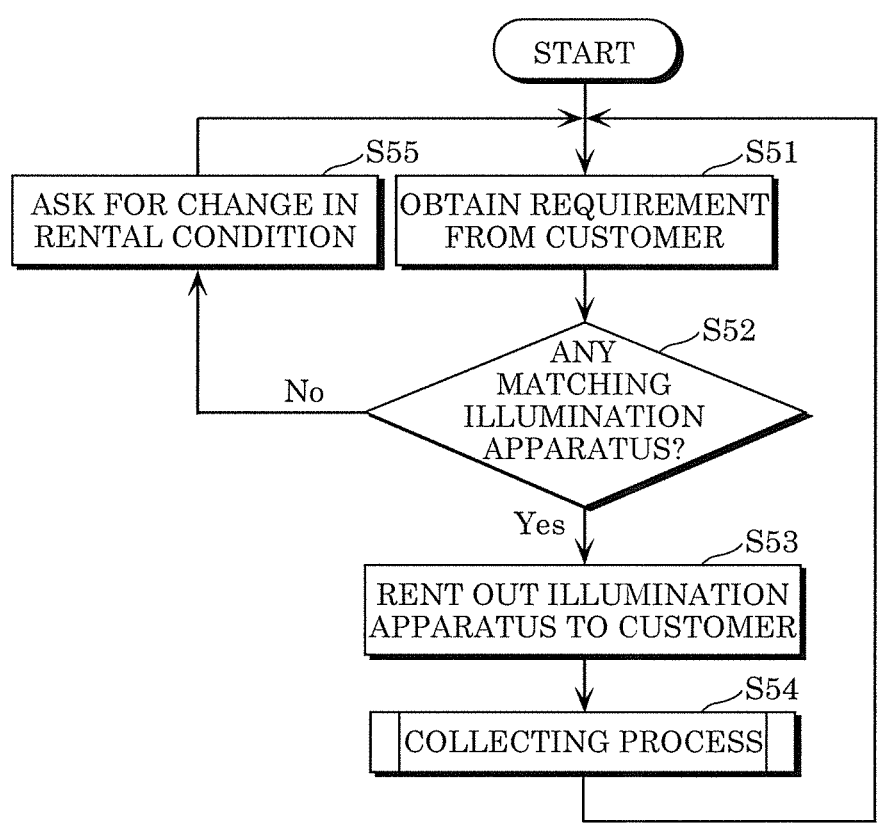
FIG. 12 is a flowchart of an exemplary process of renting out a used illumination apparatus.

Illumination apparatus management server 300 may manage new illumination apparatus 110 and used illumination apparatus 110 separately. FIG. 11 is a flowchart of an exemplary process of renting out new illumination apparatus 110. FIG. 12 is a flowchart of an exemplary process of renting out used illumination apparatus 110.

First, the process of renting out new illumination apparatus 110 will be described.

As illustrated in FIG. 11, new illumination apparatus 110 is manufactured and then rented out to a customer (S41). After the expiration of the rental period (S42), new illumination apparatus 110 is collected and inspected (S43). Illumination apparatus 110 that has been determined to have an anomaly in the inspection (Yes in S44) is discarded (S46). Illumination apparatus 110 that has not been determined to have an anomaly in the inspection (No in S44) is further added to a list of used illumination apparatuses 110 (S45). In other words, illumination apparatus 110 that has not been determined to have an anomaly in the inspection is to be rented out as used illumination apparatus 110.

It should be noted that new illumination apparatus 110 illustrated in the flowchart of FIG. 11 includes both of illumination apparatus 110 before purchased and illumination apparatus 110 that is in stock.

If new illumination apparatus 110 is currently rented out and a predetermined period has passed since the beginning of the rental, illumination apparatus management server 300 may present a rental contract of another illumination apparatus. Here, another illumination apparatus mentioned above is an illumination apparatus having equivalent specifications to illumination apparatus 110 that is currently rented out or a new illumination apparatus serving as a higher-line model of illumination apparatus 110 that is currently rented out. More specifically, illumination apparatus management server 300 transmits information for causing display unit 353 of information communication terminal 350 to display another illumination apparatus, or transmits information for printing out a proposal for an estimate on or a new rental contract of another illumination apparatus. In such a case, illumination apparatus management server 300 may also instruct information communication terminal 350 of a salesperson to visit the customer.

Now, the process of renting out used illumination apparatus 110 will be described.

As illustrated in FIG. 12, illumination apparatus management server 300 (communication unit 301) obtains the requirement from the customer (S51). If there is illumination apparatus 110 that matches the requirement from the customer (Yes in S52), that illumination apparatus 110 is rented out to the customer (S53). Then, after the expiration of the rental period, the collecting process (the process illustrated in the flowchart of FIG. 9) is carried out (S54).

On the other hand, if there is no illumination apparatus 110 that matches the requirement from the customer (No in S52), illumination apparatus management server 300 asks the customer to change the requirement (S55). More specifically, illumination apparatus management server 300 (communication unit 301) transmits information for displaying a message that urges the change in the requirement in display unit 353 of information communication terminal 350 to information communication terminal 350 (communication unit).

It should be noted that used illumination apparatus 110 illustrated in the flowchart of FIG. 12 includes illumination apparatus 110 that is currently rented out and used illumination apparatus 110 that is in stock.

New illumination apparatus 110 and used illumination apparatus 110 are managed by one illumination apparatus management system 10 as in Embodiment 1 described above. Alternatively, new illumination apparatus 110 and used illumination apparatus 110 may be managed individually by two illumination apparatus management systems, which are an illumination apparatus management system managing only new illumination apparatus 110 and an illumination apparatus management system managing only used illumination apparatus 110. In the case where the two illumination apparatus management systems are used as mentioned above, once illumination apparatus 110 changes from a new state to an used state, it is transferred to the illumination apparatus management system for new product.

(Other Embodiments)

Although illumination apparatus management system 10 and information communication terminal 350 according to Embodiment 1 have been described above, the present disclosure is not limited to Embodiment 1.

In Embodiment 1 described above, the status of use transmitted by illumination apparatus 110 has been the cumulative lighting time. However, it may be information indicating the brightness at the time of transmission or the color temperature at the time of transmission. Also, the status of use may be information indicating frequency of use of illumination apparatus 110 or information indicating that illumination apparatus 110 has anomalous brightness or color temperature.

In Embodiment 1 described above, illumination apparatus management system 10 has been used for the rental business. However, it may also be used for businesses other than the rental business such as a business of selling illumination apparatus 110.

Furthermore, the light-emitting element (light source) provided in light-emitting portion 120 described in Embodiment 1 above is not limited to the LED element. Light-emitting portion 120 may include a semiconductor light-emitting element such as a semiconductor laser or a solid-state light-emitting element such as an organic electro luminescence (EL) or an inorganic EL, for example.

Incidentally, Embodiment 1 described above has illustrated an example in which illumination apparatus management server 300 directly obtains the status of use for the plurality of illumination apparatuses 110. However, another management apparatus for managing the plurality of illumination apparatuses 110 may be provided, and illumination apparatus management server 300 may obtain the status of use of each illumination apparatus 110 by communicating with such a management apparatus. In this case, the management apparatus is provided at a store, a factory, an office or the like, whereby it is possible to manage the illumination apparatuses at a plurality of stores or factories using the illumination apparatus management server while individually managing the illumination apparatuses at the store, the factory, the office or the like.

In Embodiment 1 described above, each structural component may be constituted by dedicated hardware or be realized by executing a software program suitable for each structural component. Each structural component may be realized by a program execution unit such as a CPU or a processor reading out and executing a software program stored in a hard disk or a recording medium such as a semiconductor memory.

Furthermore, in Embodiment 1 described above, a process executed by a specific processing unit may be executed by another processing unit. Moreover, the order of a plurality of processes may be changed, or a plurality of processes may be executed in parallel. For example, measuring unit 155 may be implemented as one function of controller 135.

It should be noted that the generic or specific aspects of the present invention may be implemented by a system, a method, an integrated circuit, a computer program or a computer-readable recording medium such as a CD-ROM. Additionally, the generic or specific aspects of the present invention may be implemented by any combination of a system, a method, an integrated circuit, a computer program and a recording medium. For example, one aspect of the present invention may be implemented as an illumination apparatus, a method for managing an illumination apparatus, and a business model such as a method for renting out an illumination apparatus.

Incidentally, the present disclosure is not limited to these embodiments or variations thereof. As long as not departing from the purport of the present invention, many variations of the above embodiments and the variations thereof conceivable by a person skilled in the art and modes configured by the combination of the structural components in different embodiments and the variations thereof fall within the scope of the present invention.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus management system comprising:
a plurality of illumination apparatuses; and
a server,
wherein each of the plurality of illumination apparatuses transmits a status of use of the illumination apparatus to the server,
the server includes:
a first obtaining unit configured to obtain the status of use transmitted by each of the plurality of illumination apparatuses;
a second obtaining unit configured to obtain a requirement from a user, the requirement being information specifying an illumination state of an illumination apparatus at a future point in time after the requirement is obtained; and
a selector that selects an illumination apparatus matching the requirement obtained by the second obtaining unit from among the plurality of illumination apparatuses with reference to the status of use obtained by the first obtaining unit, and outputs a selection result indicating the illumination apparatus that has been selected, and
wherein the selector predicts an illumination state of each of the plurality of illumination apparatuses at the future point in time from the status of use obtained by the first obtaining unit, and selects an illumination apparatus from among the plurality of illumination apparatuses, wherein the illumination apparatus has a predicted illumination state that matches the illumination state specified by the requirement.

2. The illumination apparatus management system according to claim 1,
wherein the status of use is cumulative lighting time of an illumination apparatus,
the requirement is information specifying brightness of an illumination apparatus at the future point in time, and
the selector predicts brightness of each of the plurality of illumination apparatuses at the future point in time from the cumulative lighting time obtained by the first obtaining unit, and selects an illumination apparatus from among the plurality of illumination apparatuses, wherein the illumination apparatus has predicted brightness that matches the brightness specified by the requirement.

3. The illumination apparatus management system according to claim 1,
wherein the status of use is cumulative lighting time of an illumination apparatus,
the requirement is information specifying a color temperature of an illumination apparatus at the future point in time, and
the selector predicts a color temperature of each of the plurality of illumination apparatuses at the future point in time from the cumulative lighting time obtained by the first obtaining unit, and selects an illumination apparatus from among the plurality of illumination apparatuses, wherein the illumination apparatus has a predicted color temperature that matches the color temperature specified by the requirement.

4. The illumination apparatus management system according to claim 1, further comprising
a storage device that stores the status of use obtained by the first obtaining unit in association with a lease period of each of the plurality of illumination apparatuses that has transmitted the status of use,
wherein the selector predicts an illumination state of each of the plurality of illumination apparatuses at the future point in time from the status of use obtained by the first obtaining unit, and selects an illumination apparatus from among the plurality of illumination apparatuses, wherein the illumination apparatus has a predicted illumination state that matches the illumination state specified by the requirement, and has a lease period that is stored in the storage device and scheduled to expire by the future point in time.

5. The illumination apparatus management system according to claim 1, wherein the status of use includes cumulative lighting time.

6. The illumination apparatus management system according to claim 1, wherein the selector outputs a selection result indicating a list which includes the illumination apparatus which the selector has selected.

7. The illumination apparatus management system according to claim 1, wherein the illumination apparatus management system is for use in an illumination apparatus rental business.

8. An illumination apparatus management system comprising:
a plurality of illumination apparatuses; and
a server,
wherein each of the plurality of illumination apparatuses transmits a status of use of the illumination apparatus to the server, and
the server includes:
a first obtaining unit configured to obtain the status of use transmitted by each of the plurality of illumination apparatuses;
a second obtaining unit configured to obtain a requirement from a user, the requirement being information specifying an illumination state of an illumination apparatus at a future point in time after the requirement is obtained; and
a selector that selects an illumination apparatus matching the requirement obtained by the second obtaining unit from among the plurality of illumination apparatuses with reference to the status of use obtained by the first obtaining unit, and outputs a selection result indicating the illumination apparatus that has been selected,
wherein the second obtaining unit is further configured to obtain quantity information specifying a total number of illumination apparatuses, and
the selector selects at least as many illumination apparatuses matching the requirement obtained by the second obtaining unit as the total number specified by the quantity information obtained by the second obtaining unit from among the plurality of illumination apparatuses based on the status of use obtained by the first obtaining unit.

9. An illumination apparatus management system comprising:
a plurality of illumination apparatuses; and
a server,
wherein each of the plurality of illumination apparatuses transmits a status of use of the illumination apparatus to the server,
the server includes:

a first obtaining unit configured to obtain the status of use transmitted by each of the plurality of illumination apparatuses;

a second obtaining unit configured to obtain a requirement from a user; and a selector that selects an illumination apparatus matching the requirement obtained by the second obtaining unit from among the plurality of illumination apparatuses with reference to the status of use obtained by the first obtaining unit, and outputs a selection result indicating the illumination apparatus that has been selected, and wherein the illumination apparatus management system further comprises:

an information communication terminal including:

an entry receiver that receives an entry of the requirement from the user;

a communication unit configured to transmit the requirement received by the entry receiver to the second obtaining unit, and receive the selection result from the selector; and a display unit configured to display the selection result received by the communication unit.

10. An information communication terminal communicating with a server that manages a plurality of illumination apparatuses, selects an illumination apparatus matching a requirement from among the plurality of illumination apparatuses based on a status of use of each of the plurality of illumination apparatuses obtained from the illumination apparatus, and outputs a selection result indicating the illumination apparatus that has been selected, the information communication terminal comprising:

an entry receiver that receives an entry of the requirement from a user;

a communication unit configured to transmit the requirement received by the entry receiver to the server, and receive the selection result from the server; and a display unit configured to display the selection result received by the communication unit.

11. The information communication terminal according to claim 10, wherein, when the requirement contains information of a period, the selection result contains information indicating that the illumination apparatus that has been selected satisfies the requirement by an end of the period, and the display unit is configured to display the selection result containing the information indicating that the illumination apparatus that has been selected satisfies the requirement by the end of the period.

12. The information communication terminal according to claim 10, wherein the selection result contains information indicating at least one of cumulative lighting time and a lifetime of the illumination apparatus that has been selected, and the display unit is configured to display the selection result containing the at least one of cumulative lighting time and a lifetime of the illumination apparatus that has been selected.

13. An information communication terminal communicating with a server that manages a plurality of illumination apparatuses, selects an illumination apparatus determined to have an anomaly from among the plurality of illumination apparatuses based on a status of use of each of the plurality of illumination apparatuses obtained from the illumination apparatus, and outputs a selection result indicating the illumination apparatus that has been selected, the information communication terminal comprising:

a communication unit configured to receive the selection result from the server; and a display unit configured to display the selection result received by the communication unit, wherein the selection result contains information indicating that the illumination apparatus indicated by the selection result has an anomaly, and the display unit is configured to display the selection result containing the information indicating that the illumination apparatus that has been selected has the anomaly.

14. The information communication terminal according to claim 13, wherein the server determines whether the illumination apparatus has the anomaly based on at least one of cumulative lighting time and a lifetime of the illumination apparatus, the selection result contains information indicating at least one of cumulative lighting time and a lifetime of the illumination apparatus that has been selected, and the display unit is configured to display the selection result containing information indicating that the illumination apparatus that has been selected has the anomaly based on the at least one of cumulative lighting time and a lifetime of the illumination apparatus.

* * * * *